United States Patent [19]

Gramling

[11] 4,389,680
[45] Jun. 21, 1983

[54] SPECIAL EFFECTS EDITING METHOD AND APPARATUS USING RETRIEVED VIDEO

[76] Inventor: William D. Gramling, 5144 Newport Ave., Chevy Chase, Md. 20016

[21] Appl. No.: 217,131

[22] Filed: Dec. 17, 1980

[51] Int. Cl.³ .......................................... H04N 5/795
[52] U.S. Cl. .................................. 360/14.1; 360/84; 360/107
[58] Field of Search .......... 360/14, 84, 107, 14.1–14.3, 360/33.1

[56] References Cited

U.S. PATENT DOCUMENTS

| 3,152,223 | 10/1964 | Wessels | 360/38 |
| 3,157,739 | 11/1964 | Okamura | 360/84 |
| 3,925,815 | 12/1975 | Lemelson | 360/14 |
| 4,163,262 | 7/1979 | Kaemmerer | 360/14 |

Primary Examiner—Raymond F. Cardillo, Jr.

[57] ABSTRACT

Apparatus and method for retrieving existing video signals from video tape just prior to re-recording to achieve dissolve edits and special-effects edits on that tape.

6 Claims, 1 Drawing Figure

SPECIAL EFFECTS EDITING METHOD AND APPARATUS USING RETRIEVED VIDEO

BACKGROUND OF THE INVENTION

Existing editing capabilities of present video recorders are limited to that of making butt-edits, i.e., the changing of one scene to another instantaneously. Production editing frequently requires special-effects editing such as 'dissolve' or 'wipe' edits, where the change from one scene to another is not abrupt, but a timed mixing of the video of the two scenes. Presently, this requires the use of an additional video recorder plus external video mixing and timing circuits.

SUMMARY OF THE INVENTION

The primary object of the present invention is to provide a self-contained special effects editing mode for video recorders.

DESCRIPTION OF THE PREFERRED EMBODIMENTS

Figure 1:
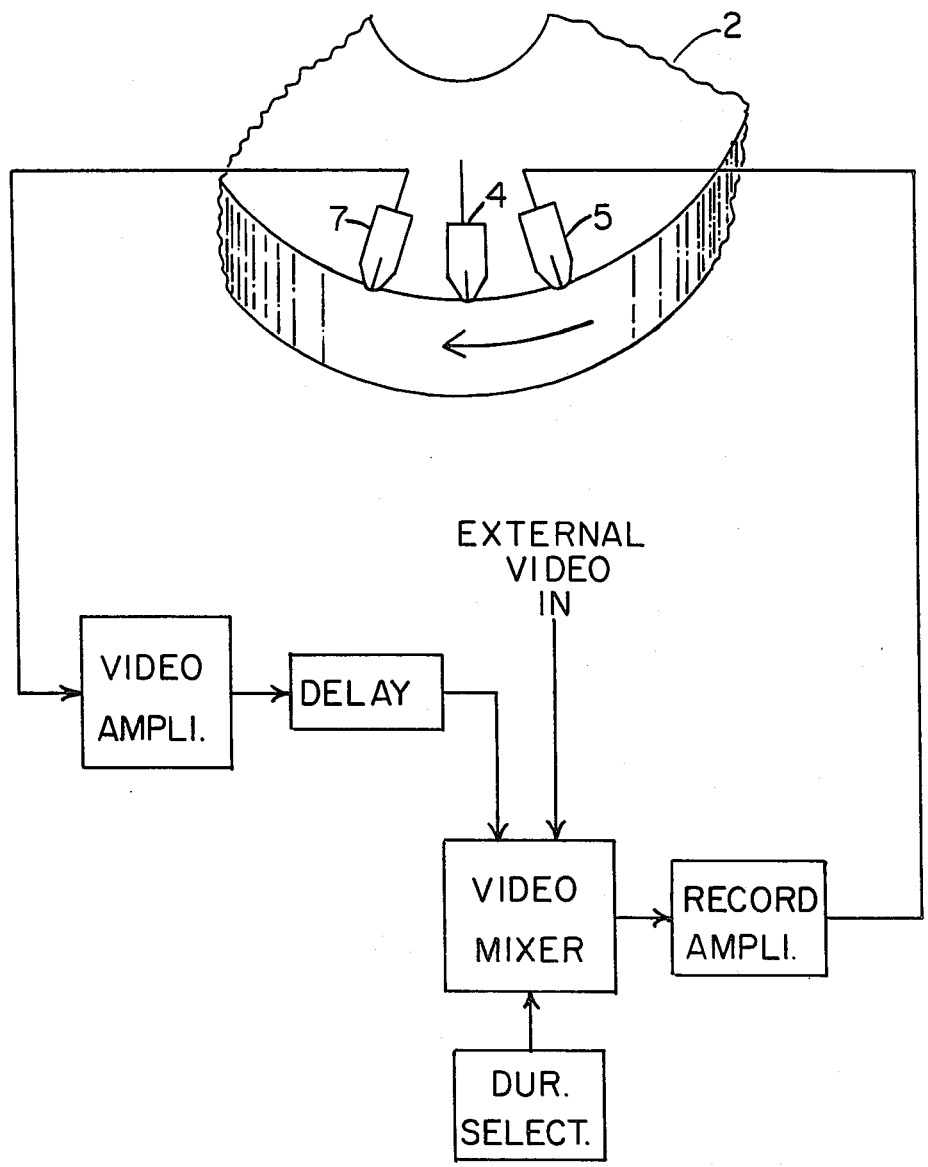
FIG. 1 shows a portion of a head wheel assembly commonly used in helical scan video recorders, the arrangements of the heads and their electrical connection with the support electronics.

Referring to FIG. 1, the video head wheel 2, containing the conventional flying-erase head 4 and record-playback head 5, is revolved at a synchronous high speed in the direction indicated by the arrow. In the record mode, the erase head 4, is supplied by appropriate bias and erases a track one scar-line ahead of the Record/PB head 5. The Record/PB head 5 is now recording a track of new video. In the normal edit mode, the recorder remains in the play-back mode until a preset edit point is reached. At this time, the erase head 4 is activated and the Record/PB head 5 is switched to the record mode, recording new video. This procedure is normal in existing recorders.

In the present invention, an edit-playback head 7 is added to the headwheel 2 and positioned so that it is reading video information exactly one line ahead of the erase head. The present invention also includes a video amplifier, a variable delay and a video mixer which is time-controlled by an edit-duration selection.

The procedure for a special-effects edit from Scene 1 to Scene 2 is as follows: The video recorder is in a play-back mode until the pre-set edit point is reached. Previously recorded video from Scene one extends several seconds past the edit point. At the edit point, the flying-erase head 4 is activated and the record head 5 records the video signal onto the tape, the video that is emerging from the record amplifier. The edit-playback head 7 is also activated, reading the video that already exists one scan-line ahead of the erase head 4. The video from the edit-playback head 7 is amplified by the amplifier and position-corrected by the variable delay. The now full-level video from the edit-playback head representing scene one is supplied to the video mixer together with the scene two video signal from the external source. The external video source is normally the output of another video playback machine, but can be a 'live' source such as a television camera or studio.

The video mixer is a special-effects generator, well-known in the industry. Its capabilities can vary according to economic considerations, allowing the present invention to make only 'dissolve' edits where scene one is slowly or quickly mixed uniformly with scene two, or elaborate, complex 'wipe' edits where scene two is wiped across the screen with a wide variety of patterns. The edit-duration selector determines the speed at which scene two is completely introduced onto the screen.

A video amplifier exists in present recorders and is normally used by the recorder in the 'play' mode by the Record/PB head. This amplifier is switched out and unused when the machine is recording. The input of this amplifier can be switched at the edit point to the output of the edit-playback head 7. This would reduce the complexity of the system, aid economy and assist in the color and level matching of the video developed from the edit-playback head 7 to the video signal that was previously recorded.

Because the edit-playback head 7 is reading video two scan-lines behind the Record/PB head 5, there will be a slight vertical movement of the picture at the edit point. Although this would not normally be objectionable, it can be corrected by placing the output of the edit-playback head 7 through a two-line delay.

The present invention can be utilized to add extra video to a completed show scene, such as superimposing names, etc. at specific points in the show. In this case, the duration-selection would be defeated and the machine placed into a permanent 'edit' mode. The extra video then would be directed into the "external video input" at specific times and premanently recorded onto the tape.

A less-preferred embodiment of the present invention would use a frame-storage device in place of the edit-playback head 7. A still-frame video of the last video of the Record/PB head 5 would be directed into the video mixer in place of the output of the edit-playback head 7. This is less desirable because it would freeze the action of scene one through the timed edit.

What I claim is:

1. In a video editing apparatus, a head assembly for receiving relatively moving video tape wherein at least a pair of transducers are mounted in a set on said head assembly, said transducers in said set comprising an erasing transducer followed by a recording transducer, the invention characterized by the addition of a further reproducing transducer in said set which retrieves the signals on video tape moving relative to said head assembly prior to said signals being erased by said erasing transducer and means for mixing video signals from another source with signals retrieved by said reproducing transducer, and transmitting said mixed signals to said recording transducer.

2. A video editing apparatus according to claim 1 wherein said head assembly comprise a rotating headwheel.

3. A video editing apparatus according to claim 1 comprising delay means connected to said reproducing transducer to delay signals prior to said signals being mixed with signals from said another source.

4. A video editing apparatus according to claim 1 wherein two sets of said transducers are mounted on said head assembly.

5. A method of mixing signals on video tape with signals from another source which comprises the steps of retrieving video signals by a transducer from a video tape moving relative to a head assembly on which said transducer is mounted, erasing said video signals on said video tape, mixing said retrieved video signals with video signals from another source, and recording said video signals on said erased video tape by a further transducer mounted on said head assembly.

6. A method of mixing signals on videotape with signals from another source according to claim 5 wherein said head assembly on which said transducers are mounted, is a rotated headwheel.

* * * * *